(12) United States Patent
Zorrilla et al.

(10) Patent No.: US 11,852,105 B2
(45) Date of Patent: Dec. 26, 2023

(54) JET NOZZLE EQUIPPED WITH A THERMALLY REGULATED RING

(71) Applicant: ARIANEGROUP SAS, Paris (FR)

(72) Inventors: Xavier Zorrilla, Le Haillan (FR); Florian Lassenay, Le Haillan (FR)

(73) Assignee: ARIANEGROUP SAS, Paris (FR)

( * ) Notice: Subject to any disclaimer, the term of this patent is extended or adjusted under 35 U.S.C. 154(b) by 106 days.

(21) Appl. No.: 17/442,826

(22) PCT Filed: Mar. 20, 2020

(86) PCT No.: PCT/FR2020/050611
§ 371 (c)(1),
(2) Date: Sep. 24, 2021

(87) PCT Pub. No.: WO2020/193925
PCT Pub. Date: Oct. 1, 2020

(65) Prior Publication Data
US 2022/0220926 A1    Jul. 14, 2022

(30) Foreign Application Priority Data

Mar. 27, 2019    (FR) ........................................ 1903196

(51) Int. Cl.
*F02K 9/97*    (2006.01)
*F02K 9/64*    (2006.01)

(52) U.S. Cl.
CPC ................ *F02K 9/972* (2013.01); *F02K 9/64* (2013.01); *F02K 9/97* (2013.01); *F05D 2260/31* (2013.01);
(Continued)

(58) Field of Classification Search
CPC ... F02K 1/002; F02K 1/80; F02K 9/97; F02K 9/972; B64D 33/04
See application file for complete search history.

(56) References Cited

U.S. PATENT DOCUMENTS 3,300,139 A * 1/1967 Feldman ................. F02K 9/972
149/108.4
5,445,469 A * 8/1995 Huck ...................... F02K 9/343
403/30

(Continued)

FOREIGN PATENT DOCUMENTS

FR    2503794 A1    10/1982
FR    2828911 A1    2/2003
(Continued)

OTHER PUBLICATIONS

International Search Report in International Application No. PCT/FR2020/050611, dated Sep. 14, 2020, with English translation (4 pages).

(Continued)

*Primary Examiner* — Kyle Robert Thomas
(74) *Attorney, Agent, or Firm* — Bookoff McAndrews, PLLC

(57) ABSTRACT

A nozzle comprises a combustion chamber having a downstream end and a divergent formed of a cone-shaped wall extending between an upstream end and a downstream end. The upstream end of the divergent is connected to the downstream end of the combustion chamber by an intermediate ring having an upstream flange fixed on a fixing flange secured to the combustion chamber and a downstream flange connected to the upstream end of the divergent. The intermediate ring having an inner channel present between the upstream and downstream flanges of the intermediate ring. A material able to take heat from the ring is present in the inner channel.

9 Claims, 6 Drawing Sheets

(52) U.S. Cl.
CPC .... *F05D 2300/10* (2013.01); *F05D 2300/603* (2013.01)

(56) References Cited

U.S. PATENT DOCUMENTS

| | | | | |
|---|---|---|---|---|
| 6,817,184 | B2* | 11/2004 | Groeber | F02K 9/976 |
| | | | | 60/770 |
| 8,413,419 | B2* | 4/2013 | Mungas | F02K 9/00 |
| | | | | 60/206 |
| 9,631,577 | B2* | 4/2017 | Lelong | F02K 9/00 |
| 11,035,321 | B2 | 6/2021 | Pichon et al. | |

FOREIGN PATENT DOCUMENTS

| | | |
|---|---|---|
| JP | 2006-249935 A | 9/2006 |
| WO | 2018002523 A1 | 1/2018 |

OTHER PUBLICATIONS

Written Opinion of the International Searching Authority in International Application No. PCT/FR2020/050611, dated Sep. 14, 2020, with English translation (8 pages).

* cited by examiner

[Fig. 1]
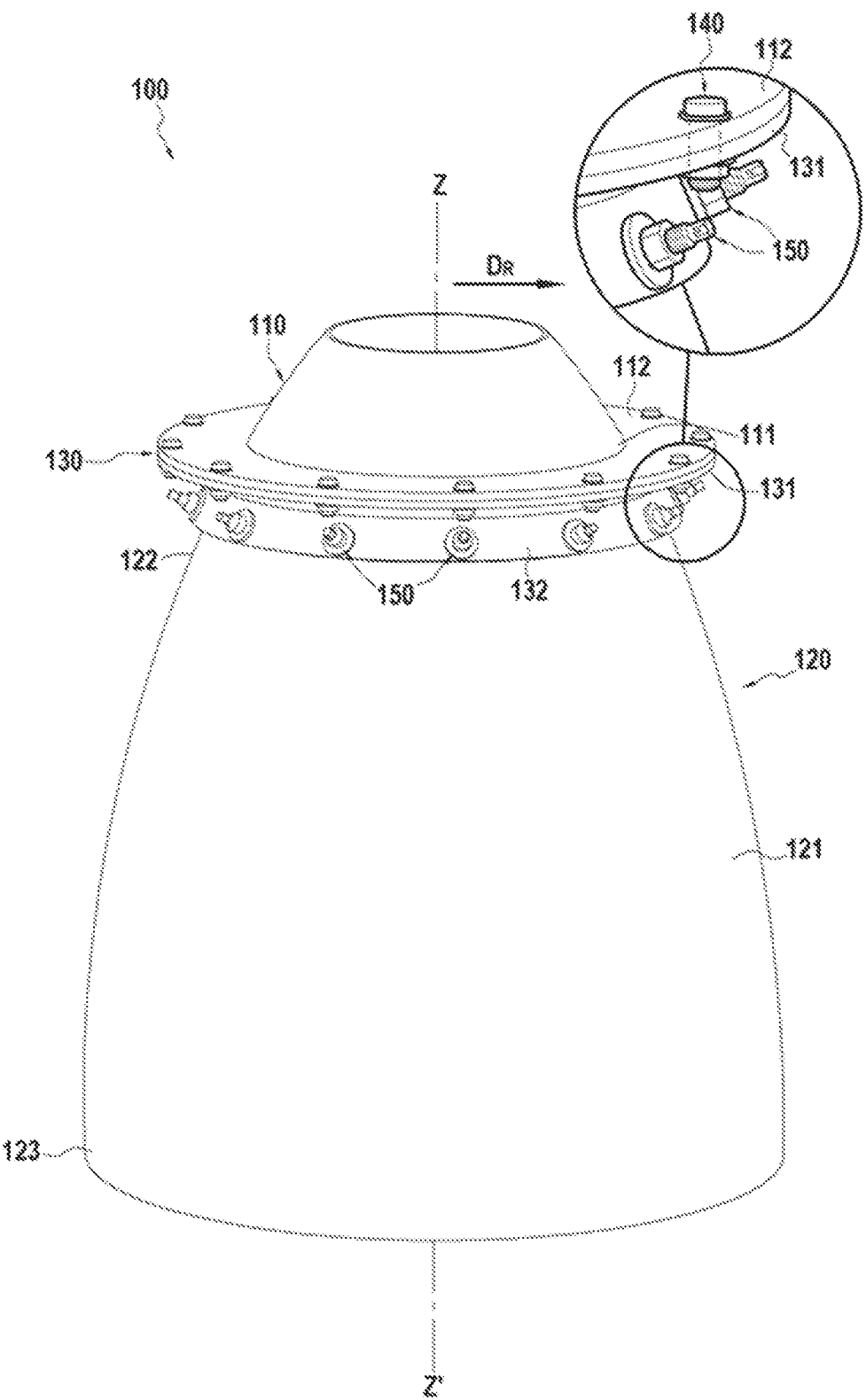

[Fig. 2]
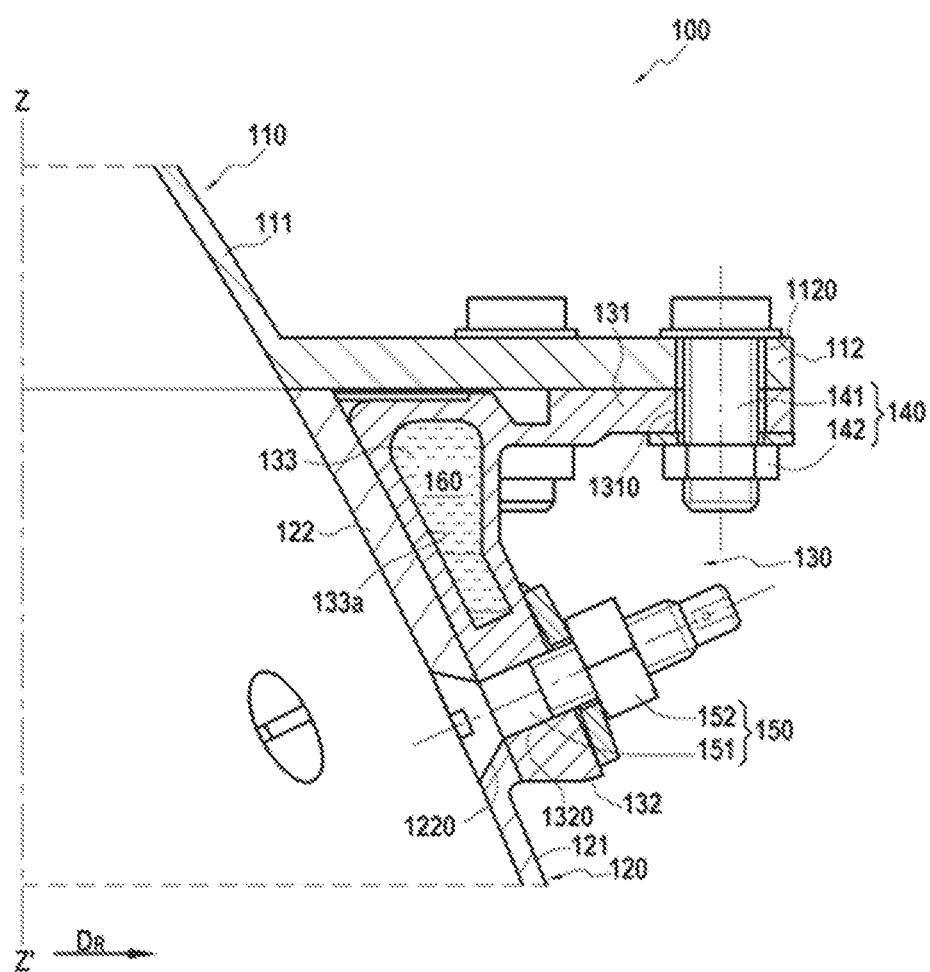

[Fig. 3]
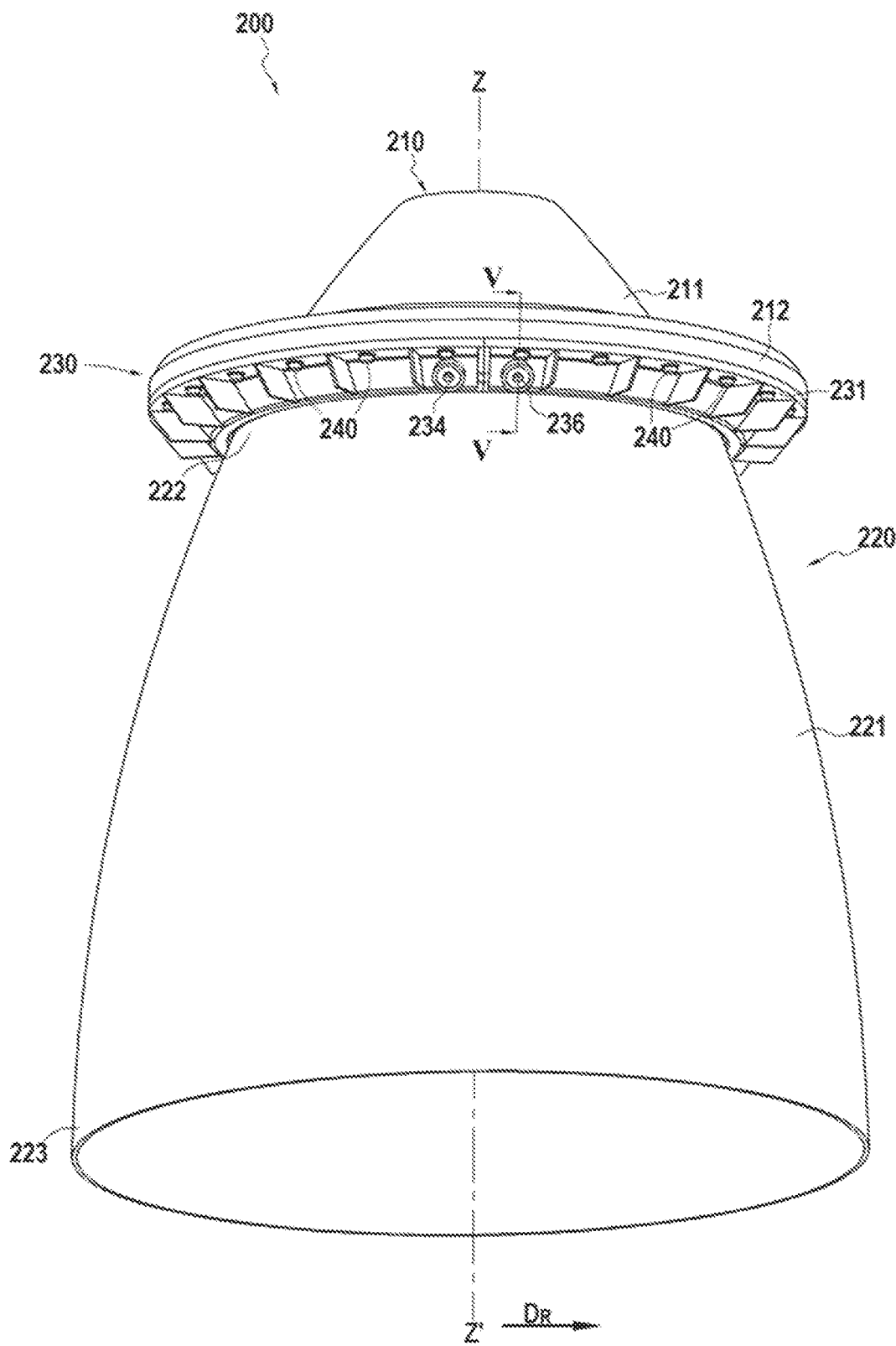

[Fig. 4]
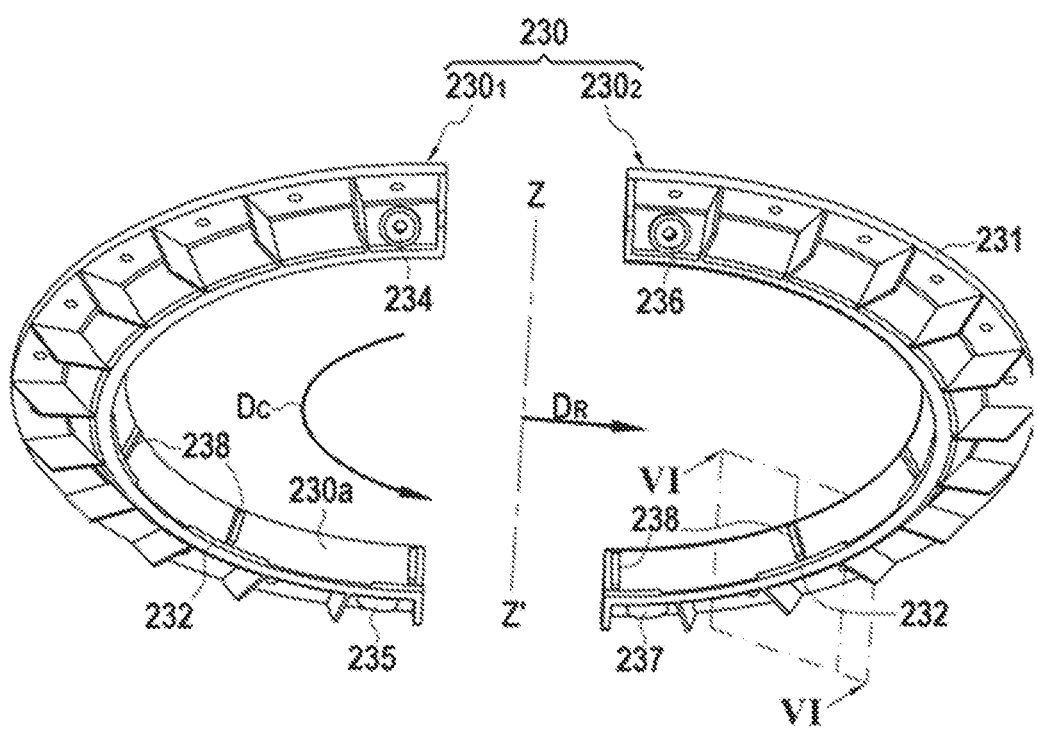

[Fig. 5]
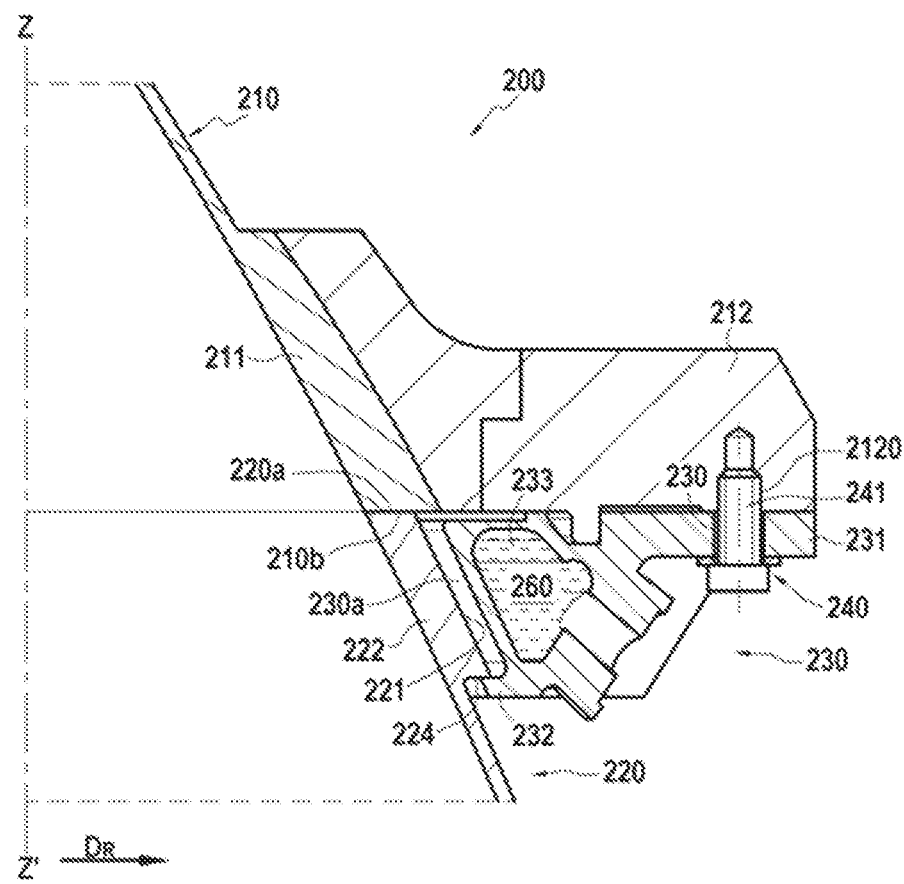

[Fig. 6]
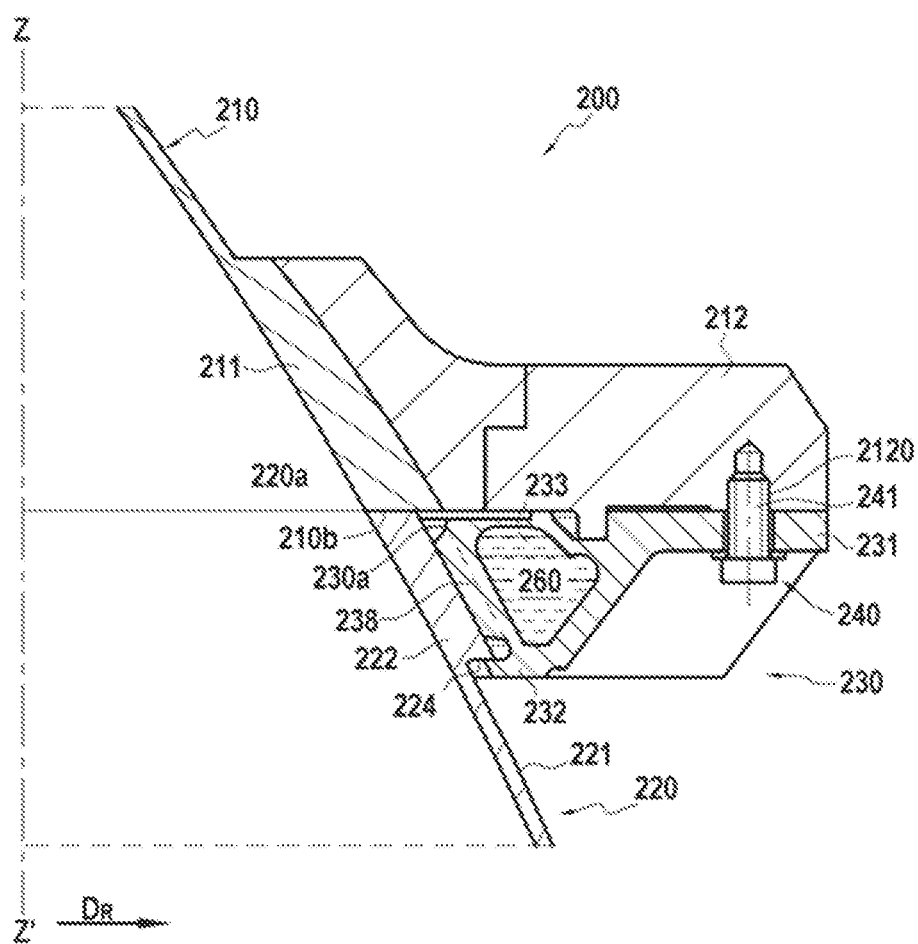

JET NOZZLE EQUIPPED WITH A THERMALLY REGULATED RING

CROSS-REFERENCE TO RELATED APPLICATIONS

This application is the U.S. national phase entry under 35 U.S.C. § 371 of International Application No. PCT/FR2020/050611, filed on Mar. 20, 2020, which claims priority to French Patent Application No. 1903196, filed on Mar. 27, 2019.

TECHNICAL FIELD

The present invention relates to a rocket engine nozzle comprising a combustion chamber and a divergent section formed of a cone-shaped wall, the divergent section being connected to the downstream end of the combustion chamber by a flange or a ring.

PRIOR ART

Document WO 2018/002523 discloses a nozzle comprising a combustion chamber made of metallic material having a downstream end and a divergent section made of composite material formed of a cone-shaped wall and whose upstream end of the divergent section made of composite material is connected to the downstream end of the combustion chamber by an annular flange made of metallic material. The downstream end of the combustion chamber is provided with a cooling circuit for reducing the temperature in the area of the combustion chamber where the axial fixation with the divergent section is made.

However, the solution consisting in providing the downstream end of the combustion chamber with a cooling circuit complicates the production of the combustion chamber as well as the geometry of the annular flange for fixing the divergent section to the chamber.

Furthermore, while the cooling circuit integrated into the combustion chamber allows effectively regulating the temperature of said chamber, it does not allow cooling the elements present in the vicinity of the downstream end of the chamber such as the annular flange. However, the annular flange is exposed to very high temperatures due to its proximity to the divergent section. Consequently, the annular flange must be capable of withstanding high temperatures, which involves the use of expensive materials.

DISCLOSURE OF THE INVENTION

The aim of the invention is to propose a solution for nozzles having more efficient thermal regulation at the connecting part between the combustion chamber and the divergent section.

This aim is achieved thanks to a nozzle having a longitudinal axis comprising a combustion chamber having a downstream end and a divergent section formed of a cone-shaped wall extending between an upstream end and a downstream end, the upstream end of the divergent section being connected to the downstream end of the combustion chamber by an intermediate ring comprising an upstream flange fixed on the downstream end of the combustion chamber and a downstream flange connected to the upstream end of the divergent section, characterized in that the intermediate ring comprises at least one inner channel present between the upstream and downstream flanges of the intermediate ring and in that a material able to take heat from the ring is present in the inner channel.

By cooling the connection between the combustion chamber and the divergent section directly at the intermediate ring, the latter is protected from the heat emitted by the divergent section, which improves the reliability of the connection between the combustion chamber and the divergent section. It is thus possible to envisage a use of the nozzle with high combustion temperatures while being able to use relatively inexpensive materials for the production of the intermediate ring. In addition, this cooling solution simplifies the geometry of the combustion chamber at its downstream end allowing envisaging a connection with different types of divergent sections.

According to one particular aspect of the nozzle according to the invention, a heat transfer fluid circulates in said at least one inner channel of the intermediate ring. The ring and the connection made thereby are cooled by means of a cooling circuit independent of that of the combustion chamber. The flow rate and the nature of the heat transfer fluid can therefore be chosen in order to obtain the best thermal regulation. This independent cooling circuit can further be used after shutdown of the rocket engine to mitigate the heating effects due to the phenomenon called "heat soak back" which corresponds to the heating after operation of some elements by others having a high thermal inertia.

According to one particular characteristic, the inner channel(s) of the intermediate ring have a geometry able to create swirls in the heat transfer fluid. This allows increasing the heat exchanges and consequently the cooling of the ring and surrounding portions.

According to another particular aspect of the nozzle according to the invention, a phase change material is present in said at least one inner channel of the intermediate ring. In this case, the thermal transfer (cooling) is made by latent heat, the phase change material being able to store the energy by a simple change of state while maintaining a temperature constant. The ring and the connection made thereby are maintained at acceptable temperature levels and independently of the cooling circuit of the combustion chamber. The properties of the phase change material can be defined based on the only need for cooling at the intermediate ring. The cooling made by the phase change material can further be used after shutdown of the rocket engine to mitigate the heating effects due to the phenomenon called "heat soak back" which corresponds to the heating after operation of some elements by others having a high thermal inertia.

According to another particular aspect of the nozzle of the invention, the downstream flange of the intermediate ring is fixed to the upstream end of the divergent section by clamping members.

According to yet another aspect of the nozzle of the invention, the downstream flange of the intermediate ring includes support lugs, said lugs cooperating with one or more shoulders present on the upstream end of the divergent section. The heat exchange surfaces between the divergent section and the ring are thus limited by minimizing the contact surface between these two elements.

According to one particular characteristic of this connecting mode, the intermediate ring comprises, on its face opposite the wall of the divergent section, bosses spaced from each other along a circumferential direction. This facilitates the radial centering of the divergent section on the intermediate ring.

The divergent section can be in particular made of metallic material or of composite material.

BRIEF DESCRIPTION OF THE DRAWINGS

FIG. 1 is a schematic view of a nozzle according to one embodiment of the invention, FIG. 2 is a schematic sectional view showing the connection between the combustion chamber and the divergent section of the nozzle of FIG. 1, FIG. 3 is a schematic view of a nozzle according to another embodiment of the invention, FIG. 4 is a schematic perspective view showing the intermediate ring of the nozzle of FIG. 3, FIG. 5 is a schematic sectional view showing the connection between the combustion chamber and the divergent section of the nozzle of FIG. 4, FIG. 6 is another schematic sectional view showing the connection between the combustion chamber and the divergent section of the nozzle of FIG. 4.

DESCRIPTION OF THE EMBODIMENTS

FIGS. 1 and 2 illustrate a rocket engine nozzle 100 in accordance with one embodiment of the invention. The nozzle 10 of longitudinal axis ZZ' comprises a combustion chamber made of metallic material 110 having a downstream end 111 and a divergent section 120 formed of a cone-shaped wall 121 extending between an upstream end 122 and a downstream end 123, the upstream end 122 of the divergent section 120 being connected to the downstream end 111 of the combustion chamber 110. The combustion chamber 110 further comprises a cooling circuit allowing circulating a coolant on the wall of the chamber (not represented in FIGS. 1 and 2) as it is the case in particular of a combustion chamber called regeneration combustion chamber.

In accordance with the invention, the nozzle 100 further comprises an intermediate ring 130 which ensures the connection between the combustion chamber 110 and the divergent section 120. The intermediate ring 130 comprises an upstream flange 131 which extends along a radial direction $D_R$ perpendicular to the longitudinal axis ZZ' and which cooperates with a fixing flange 112 extending along the radial direction at the downstream end 111 of the combustion chamber 110. The upstream flange 131 of the intermediate ring 130 is fixed to the fixing flange 112 of the combustion chamber by a plurality of clamping members 140 each comprising a fixing screw 141 and a nut 142, each fixing screw 141 passing through an orifice 1120 present on the fixing flange 112 and an orifice 1310 present on the upstream flange 131.

The intermediate ring 130 comprises a downstream flange 132 which is fixed to the upstream end 122 of the divergent section 120 by a plurality of clamping members 150 each comprising a fixing screw 151 and a nut 152, each fixing screw 151 passing through an orifice 1320 present on the downstream flange 132 and an orifice 1220 present on the upstream end 122 of the divergent section 120.

In accordance with the invention, the intermediate ring 130 further comprises an inner channel 133 present between the upstream flange 131 and the downstream flange 132. In the example described here, the inner channel extends annularly and forms a circulation circuit for a heat transfer fluid 160 which circulates in the channel 133 between an inlet and an outlet (not represented in FIGS. 1 and 2). A pumping and heat exchanger system (not represented in FIGS. 1 and 2) independent of the one used for the cooling circuit of the combustion chamber is connected between the inlet and the outlet of the inner channel in order to ensure the continuous circulation of the heat transfer fluid and the thermoregulation of the intermediate ring 130. The thermal regulation of the intermediate ring and of the elements thermally in contact therewith is thus made by a cooling device independent of that of the combustion chamber. The flow rate and the nature of the heat transfer fluid can therefore be chosen in order to obtain the best thermal regulation. This independent cooling circuit can further be used after shutdown of the rocket engine to mitigate the heating effects due to the phenomenon called "heat soak back" which corresponds to the heating after operation of some elements by others having a high thermal inertia.

According to one particular characteristic, the inner channel 133 has a geometry able to create swirls allowing increasing the heat exchanges and, consequently, the cooling of the ring and of the surrounding portions.

The heat, particularly convective, exchanges can further be improved by structuring the inner surface 133a of the channel 133, for example by forming therein porosities or open cavities on said inner surface. This structuring can be obtained by producing the intermediate ring by additive manufacturing.

According to one variant of embodiment, the inner channel 133 of the intermediate ring is filled with a phase change material instead of the heat transfer fluid. In this case, the inner channel is no longer connected to a pumping and heat exchanger system, because the phase change material is statically present in the inner channel. At least one fill/drain valve (not represented in FIGS. 1 and 2) is provided instead of the inlet and outlet of the inner channel. In this case, the thermal transfer (cooling) is made by latent heat, the phase change material being able to store the energy by simple change of state while maintaining a temperature constant. The ring and the connection made thereby are cooled independently of the cooling circuit of the combustion chamber. The properties of the phase change material can be defined based only on the need for cooling at the intermediate ring. The cooling made by the phase change material can further be used after shutdown of the rocket engine to mitigate the heating effects due to the phenomenon called "heat soak back" which corresponds to the heating after operation of some elements by others having a high thermal inertia.

The phase change material can in particular be paraffin or water.

FIGS. 3 to 6 illustrate another embodiment of a nozzle according to the invention which differs from the nozzle 100 described above, in particular at the connection between the intermediate ring and the divergent section. More specifically, in FIG. 3, the nozzle 200 of longitudinal axis ZZ' comprises a combustion chamber made of metallic material 210 having a downstream end 211 and a divergent section 220 formed of a cone-shaped wall 221 extending between an upstream end 222 and a downstream end 223, the upstream end 222 of the divergent section 220 being connected to the downstream end 211 of the combustion chamber 210. The combustion chamber 210 further comprises a cooling circuit for circulating a coolant on the wall of the chamber (not represented in FIGS. 3 to 6).

The nozzle 200 further comprises an intermediate ring 230 which ensures the connection between the combustion chamber 210 and the divergent section 220. The intermediate ring 230 comprises an upstream flange 231 which extends along a radial direction DR perpendicular to the longitudinal axis ZZ' and which cooperates with a fixing flange 212 extending along the radial direction at the downstream end 211 of the combustion chamber 210. The upstream flange 231 of the intermediate ring 230 is fixed to the fixing flange 212 of the chamber combustion by a plurality of clamping members 240 each comprising a fixing screw 241. Each fixing screw 241 passes through an orifice 2310 present on the upstream flange 231 and is screwed into a threaded bore 2120 present on the fixing flange 212.

In the example described here, the downstream flange of the intermediate ring 230 consists of the support lugs 232 spaced from each other along a circumferential direction $D_C$. The support lugs 232 extend from the inner face 230a of the ring 230 opposite the wall 221 of the divergent section 220 along the radial direction $D_R$. The support lugs 232 cooperate with an annular shoulder 224 present on the wall 221 of the divergent section at its upstream end 222. Once the intermediate ring 230 is fixed on the combustion chamber 210 and the support lugs 232 are in contact with the shoulder 224, the proximal portion 220a of the divergent section 220 is held bearing on the distal portion 210b of the combustion chamber 210 thus ensuring continuity between the inner surfaces of the combustion chamber and of the divergent section.

In the example described here, the intermediate ring 230 comprises, on its inner face 230a opposite the wall 221 of the divergent section 220, bosses 238 spaced from each other along the circumferential direction $D_C$. This facilitates the radial centering of the divergent section on the intermediate ring.

In accordance with the invention, the intermediate ring 230 further comprises an inner channel 233 present between the upstream flange 231 and the downstream flange 232. In the example described here, the inner channel extends annularly and forms a circulation circuit for a heat transfer fluid 260 which circulates in the channel 233 between an inlet 234, 236 and an outlet 235, 237 (FIG. 4). A pumping and heat exchanger system (not represented in FIGS. 3 to 6) independent of the one used for the cooling circuit of the combustion chamber is connected between the inlet and the outlet of the inner channel in order to ensure the continuous circulation of the heat transfer fluid and the thermoregulation of the intermediate ring 230. The thermal regulation of the intermediate ring and of the elements thermally in contact therewith is thus made by a cooling device independent of that of the combustion chamber. The flow rate and the nature of the heat transfer fluid can therefore be chosen in order to obtain the best thermal regulation. This independent cooling circuit can further be used after shutdown of the rocket engine to mitigate the heating effects due to the phenomenon called "heat soak back" which corresponds to the heating after operation of some elements by others having a high thermal inertia.

According to one particular characteristic, the inner channel 233 has a geometry able to create swirls allowing increasing the heat exchanges and, consequently, the cooling of the ring and of the surrounding portions.

The heat, particularly convective, exchanges can further be improved by structuring the inner surface 233a of the channel 133, for example by forming therein porosities or open cavities on said inner surface. This structuring can be obtained by producing the intermediate ring by additive manufacturing.

According to one variant of embodiment, the inner channel 233 of the intermediate ring is filled with a phase change material instead of the heat transfer fluid. In this case, the inner channel is no longer connected to a pumping and heat exchanger system, because the phase change material is statically present in the inner channel. At least one fill/drain valve (not represented in FIGS. 3 to 6) is provided instead of the inlet 234, 236 and of the outlet 235, 237 of the inner channel 233. In this case, the thermal transfer (cooling) is made by latent heat, the phase change material being able to store the energy by simple change of state while maintaining a temperature constant. The ring and the connection made thereby are cooled independently of the cooling circuit of the combustion chamber. The properties of the phase change material can be defined based on the only need for cooling at the intermediate ring. The cooling made by the phase change material can further be used after shutdown of the rocket engine to mitigate the heating effects due to the phenomenon called "heat soak back" which corresponds to the heating after operation of some elements by others having a high thermal inertia.

In the example described here, the intermediate ring 233 is formed of two half-rings $233_1$ and $233_2$ each comprising respectively an inlet 234, 236 and an outlet 235, 237 for the circulation of the heat transfer fluid. The inlets 234, 236 and the outlets 235, 237 being replaced by fill/drain valves in case of use of a phase change material instead of a heat transfer fluid.

Furthermore, in the example described here, the support lugs 232 are spaced from each other by material interruption between the lugs. However, the lugs 232 can also be produced with a continuous ring present protruding from the inner surface 230a of the intermediate ring 233. Likewise, the shoulder 224 is continuous in the present example. According to one variant of embodiment, the shoulder could be discontinuous in order to form a plurality of shoulders spaced from each other around the upstream end of the divergent section.

The divergent section of the nozzle of the invention can be made of metallic material or of composite material. The divergent section can be particularly made of ceramic matrix composite (CMC) material which, in a known manner, is a material formed of a carbon or ceramic fiber reinforcement densified by an at least partially ceramic matrix, such as one of the following CMC composite materials:
  carbon-carbon/silicon carbide (C/C-SiC) corresponding to a material formed of a carbon fiber reinforcement and densified by a matrix comprising a carbon phase and a silicon carbide phase,
  carbon-silicon carbide (C/SiC) which is a material formed of a carbon fiber reinforcement densified by a silicon carbide matrix,
  silicon carbide-silicon carbide (SiC/SiC) corresponding to a material formed of a silicon carbide fiber reinforcement densified by a silicon carbide matrix,
  oxide/oxide type CMC material corresponding to a material formed of a refractory oxide fiber reinforcement, for example fibers based on alumina $Al_2O_3$, densified by a refractory oxide matrix.

The divergent section may also be made of a carbon/carbon (C/C) composite material which, in a known manner, is a material formed of a carbon fiber reinforcement densified by a carbon matrix and which may be possibly provided with a coating such as for example a ceramic deposit (example SiC).

Thanks to the thermo-regulated intermediate ring of the invention, it is possible to envisage higher operating temperatures for the nozzle as well as the use of materials having maximum use temperatures lower than the temperatures seen by the divergent section such as Inconel® type alloys. The thermal regulation of the intermediate ring further allows reducing the temperature gradient between the divergent section and the cooled combustion chamber.

The invention claimed is:

1. A nozzle having a longitudinal axis comprising a divergent section formed of a cone-shaped wall extending between an upstream end and a downstream end, the upstream end of the divergent section being intended to be connected to a downstream end of a combustion chamber by an intermediate ring comprising an upstream flange fixed on a fixing flange secured to the combustion chamber and a downstream flange connected to the upstream end of the divergent section, wherein the intermediate ring comprises at least one inner channel present between the upstream and downstream flanges of the intermediate ring, said at least one inner channel being located at the upstream end of the divergent section, and wherein a material able to take heat from the intermediate ring is present in said at least one inner channel, wherein the intermediate ring extends around the outside of the cone-shaped wall of the divergent section.

2. The nozzle according to claim 1, wherein a heat transfer fluid circulates in said at least one inner channel of the intermediate ring.

3. The nozzle according to claim 2, wherein said at least one inner channel has a geometry able to create swirls in the heat transfer fluid.

4. The nozzle according to claim 1, wherein a phase change material is present in said at least one inner channel of the intermediate ring.

5. The nozzle according to claim 1, wherein the downstream flange of the intermediate ring is fixed to the upstream end of the divergent section by clamping members.

6. The nozzle according to claim 1, wherein the downstream flange of the intermediate ring includes support lugs, said lugs cooperating with one or more shoulders present on the upstream end of the divergent section.

7. The nozzle according to claim 6, wherein the intermediate ring comprises, on its inner face opposite the wall of the divergent section, bosses spaced from each other along a circumferential direction.

8. The nozzle according to claim 1, wherein the divergent section is made of metallic material or of composite material.

9. The nozzle according to claim 1, wherein the combustion chamber is directly connected to the divergent section.

* * * * *